United States Patent
Zhou et al.

(10) Patent No.: US 9,005,781 B2
(45) Date of Patent: *Apr. 14, 2015

(54) MAGNETIC RECORDING MEDIUM FOR PERPENDICULAR MAGNETIC RECORDING

(75) Inventors: Jianing Zhou, Fremont, CA (US); B. Ramamurthy Acharya, Fremont, CA (US); E. Noel Abarra, Tokyo (JP); Gunn Choe, San Jose, CA (US)

(73) Assignee: Seagate Technology LLC, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/620,324

(22) Filed: Sep. 14, 2012

(65) Prior Publication Data

US 2013/0022842 A1    Jan. 24, 2013

Related U.S. Application Data (60) Continuation of application No. 12/879,849, filed on Sep. 10, 2010, now Pat. No. 8,277,962, which is a division of application No. 11/686,865, filed on Mar. 15, 2007, now Pat. No. 7,901,802.

(60) Provisional application No. 60/782,986, filed on Mar. 15, 2006.

(51) Int. Cl.
G11B 5/667     (2006.01)
G11B 5/82      (2006.01)

(52) U.S. Cl.
CPC . *G11B 5/82* (2013.01); *G11B 5/667* (2013.01)

(58) Field of Classification Search
None
See application file for complete search history.

(56) References Cited

U.S. PATENT DOCUMENTS

| | | |
|---|---|---|
| 5,180,609 A | 1/1993 | Nakamura et al. |
| 5,580,667 A | 12/1996 | Lai et al. |
| 5,942,342 A | 8/1999 | Hikosaka et al. |
| 6,641,935 B1 | 11/2003 | Li et al. |
| 6,731,458 B2 | 5/2004 | Watanabe et al. |
| 6,778,358 B1 | 8/2004 | Jiang et al. |
| 6,788,358 B1 | 9/2004 | Jiang et al. |
| 6,818,330 B2 | 11/2004 | Shukh et al. |
| 6,828,785 B2 | 12/2004 | Hosomi et al. |
| 6,835,475 B2 | 12/2004 | Carey et al. |
| 6,890,667 B1 | 5/2005 | Lairson et al. |

(Continued)

FOREIGN PATENT DOCUMENTS

JP    2008-077765    *    4/2008

OTHER PUBLICATIONS

Monson et al. IEEE Transactions on Magnetics. vol. 35, No. 5, 1999. p. 2700-2702.*

(Continued)

*Primary Examiner* — Vera Katz
(74) *Attorney, Agent, or Firm* — Hollingsworth Davis, LLC (57) ABSTRACT

A perpendicular recording medium having a perpendicular magnetic recording layer and a magnetically soft underlayer structure disposed beneath the recording layer. The soft underlayer structure includes at least first and second soft magnetic layers having different magnetic permeabilities to create a magnetic permeability gradient in the soft underlayer structure. One or more of the soft magnetic layers can be antiparallel coupled. The soft underlayer structure of the present invention having a magnetic permeability gradient advantageously leads to reduced adjacent track erasure (ATE) while maintaining good overwrite (OW) properties.

3 Claims, 7 Drawing Sheets

(56) References Cited

U.S. PATENT DOCUMENTS

| | | | |
|---|---|---|---|
| 7,166,375 | B2 | 1/2007 | Shimizu et al. |
| 7,199,985 | B1 | 4/2007 | Sato et al. |
| 7,241,516 | B1 | 7/2007 | Acharya et al. |
| 7,378,164 | B1 | 5/2008 | Lairson et al. |
| 7,666,529 | B2 | 2/2010 | Girt et al. |
| 7,901,802 | B2 | 3/2011 | Zhou et al. |
| 2002/0058160 | A1 | 5/2002 | Oikawa et al. |
| 2002/0127433 | A1 | 9/2002 | Shimizu et al. |
| 2003/0035973 | A1 | 2/2003 | Trindale et al. |
| 2004/0224184 | A1 | 11/2004 | Hikosaka et al. |
| 2005/0008902 | A1 | 1/2005 | Bertero et al. |
| 2005/0089726 | A1 | 4/2005 | Abarra |
| 2005/0146803 | A1 | 7/2005 | Kim et al. |
| 2006/0093865 | A1 | 5/2006 | Lim et al. |
| 2006/0147758 | A1 | 7/2006 | Jung et al. |
| 2006/0257677 | A1 | 11/2006 | Choi et al. |
| 2007/0183923 | A1 | 8/2007 | Choi et al. |
| 2007/0217074 | A1 | 9/2007 | Zhou et al. |
| 2007/0287031 | A1 | 12/2007 | Nolan et al. |
| 2010/0328818 | A1 | 12/2010 | Zhou et al. |
| 2011/0043939 | A1* | 2/2011 | Nolan et al. .................. 360/55 |

OTHER PUBLICATIONS

Fohse et al. $7^{th}$ International Symposium on Magnetic Materials, Oct. 2002.*
File History for U.S. Appl. No. 11/686,865.
File History for U.S. Appl. No. 12/879,849.
Acharya et al., "Anit-Parrallel Coupled Soft Under Layers for High-Density Perpendicular Recording", IEEE Transactions on Magnetics, vol. 40, No. 4, Jul. 2004, pp. 2383-2385.
File History for U.S. Appl. No. 12/544,091.
International Search Report and Written Opinion dated May 6, 2011 from PCT Application No. PCT/US2010/046010, 7 pages.
International Preliminary Report on Patentability dated Feb. 21, 2012 from PCT Application No. PCT/US2010/046010, 6 pages.
Office Action dated Jun. 4, 2014 from Chinese Application No. 201080037287.5, 23 pages.
U.S. Appl. No. 12/544,091.

* cited by examiner

MAGNETIC RECORDING MEDIUM FOR PERPENDICULAR MAGNETIC RECORDING

CROSS REFERENCE TO RELATED APPLICATIONS

This application is a continuation of U.S. application Ser. No. 12/879,849 filed Sep. 10, 2010, now U.S. Pat. No. 8,277,962, which is a divisional of U.S. application Ser. No. 11/686,865 filed Mar. 15, 2007, now U.S. Pat. No. 7,901,802, which claims priority to U.S. Provisional Patent Application Ser. No. 60/782,986, filed on Mar. 15, 2006, which are incorporated herein by reference in their entireties.

FIELD OF THE INVENTION

The present invention is directed to a magnetic recording medium that includes a magnetic recording layer and a magnetically soft underlayer structure. The magnetic recording medium is particularly adapted for perpendicular magnetic recording.

BACKGROUND OF THE INVENTION

Thin film magnetic recording media are composed of multiple layers disposed on a substrate, including one or more magnetic recording layers. Typically, the magnetic recording layer includes small magnetic grains that have an easy magnetization axis that is magnetically oriented longitudinally (i.e., in plane) with respect to the magnetic layer.

The areal density of such longitudinal magnetic recording media has been increasing at a compounded growth rate of about 60% per year and areal densities as high as 100 gigabits per square inch ($Gbit/in^2$) have been demonstrated. Scaling longitudinal recording media to higher areal densities requires smaller magnetic grains. However, as the grain size is reduced, thermal fluctuations can cause the magnetic domains to "flip", resulting in a loss of magnetization over a period of time.

Perpendicular (i.e., vertical) magnetic recording media have been proposed as a way to increase areal densities beyond 100 $Gbit/in^2$. Perpendicular magnetic recording media include a magnetic recording layer having an easy magnetization axis that is oriented substantially perpendicular to the magnetic recording layer. A perpendicular write-head, such as a monopole write-head or a shielded pole write-head, is utilized to magnetize the grains in the perpendicular recording layer.

The write-head for perpendicular recording media includes a write pole and a return pole, where the return pole is magnetically coupled to the write pole. An electrically conductive magnetizing coil surrounds the yoke of the write pole and is adapted to switch the polarity of the magnetic field applied to the write pole. During operation, the write-head flies above the magnetic recording medium by a distance referred to as the fly height, and an electrical current is passed through the coil to create a magnetic flux within the write pole. The magnetic flux passes from the write pole tip through the magnetic recording layer and into a magnetically soft underlayer (SUL) that is disposed beneath the magnetic recording layer. The SUL causes the magnetic flux to pass across to the return pole of the write-head. In addition, the SUL produces magnetic charge images during read operations, increasing the magnetic flux and the playback signal.

In a shielded pole write-head, a shield is disposed next to the write pole to increase the write field gradient. The shield, however, also leads to an additional flux path that consists of the write pole shield, the SUL, and the reader shields. Therefore, the write coil also induces flux through this additional path during writing, which can result in adjacent track erasure (ATE) that takes place underneath the write pole shield and/or underneath the reader shields. Given the large footprint of the shields, ATE can occur over a span as wide as 60 µm in the cross-track direction, a phenomena referred to as wide area ATE.

Since the SUL is part of the flux return path, the magnetic properties of the SUL play an important role in the ATE mechanism. For example, an anti-parallel coupled SUL (APS) can be used to suppress ATE and the reduced magnetic permeability (µ) in the presence of an APS has been implicated as one possible reason. Simulations have also suggested that perpendicular recording media having an SUL with a magnetic permeability of about 100 or less would have reduced ATE.

A competing property of the perpendicular magnetic recording medium is media overwrite (OW). Overwrite (-dB) is a measure of the over bias required to completely erase a lower frequency signal with a higher frequency signal. Data loss due to ATE could be mitigated by increasing the magnetic coercivity of the magnetic recording layer, however increased magnetic coercivity makes sufficient overwrite difficult to achieve.

SUMMARY OF THE INVENTION

There is a need for a perpendicular recording medium having reduced adjacent rack erasure, while maintaining good overwrite properties. Accordingly, one aspect of the present invention is directed to a perpendicular recording medium that includes a soft underlayer structure. The soft underlayer structure can include two or more soft magnetic layers having different magnetic permeabilities to create a magnetic permeability gradient in the soft underlayer structure.

According to one aspect, a magnetic recording medium for perpendicular magnetic recording is provided, the recording medium includes a substrate, a soft underlayer structure disposed over the substrate, an intermediate layer disposed over the underlayer structure, and a perpendicular magnetic recording layer disposed over the intermediate layer. The soft underlayer structure comprises a first soft magnetic layer having a first magnetic permeability and a second soft magnetic layer that is disposed over the first soft magnetic layer and having a second magnetic permeability, wherein the first magnetic permeability is different than the second magnetic permeability.

One of more of the soft magnetic layers can be an anti-parallel coupled soft magnetic layer.

DESCRIPTION OF THE INVENTION

The present invention is directed to a magnetic recording medium including a perpendicular magnetic recording layer. As used herein, a perpendicular magnetic recording layer is a magnetic recording layer where the magnetic grains have an easy magnetization axis that is oriented substantially perpendicular to the plane of the layer (i.e., the radial axis). The magnetic recording medium can be, for example, a magnetic tape or a magnetic hard disk, and in a preferred embodiment is a magnetic hard disk, such as for use in a disk drive.

Figure 1:
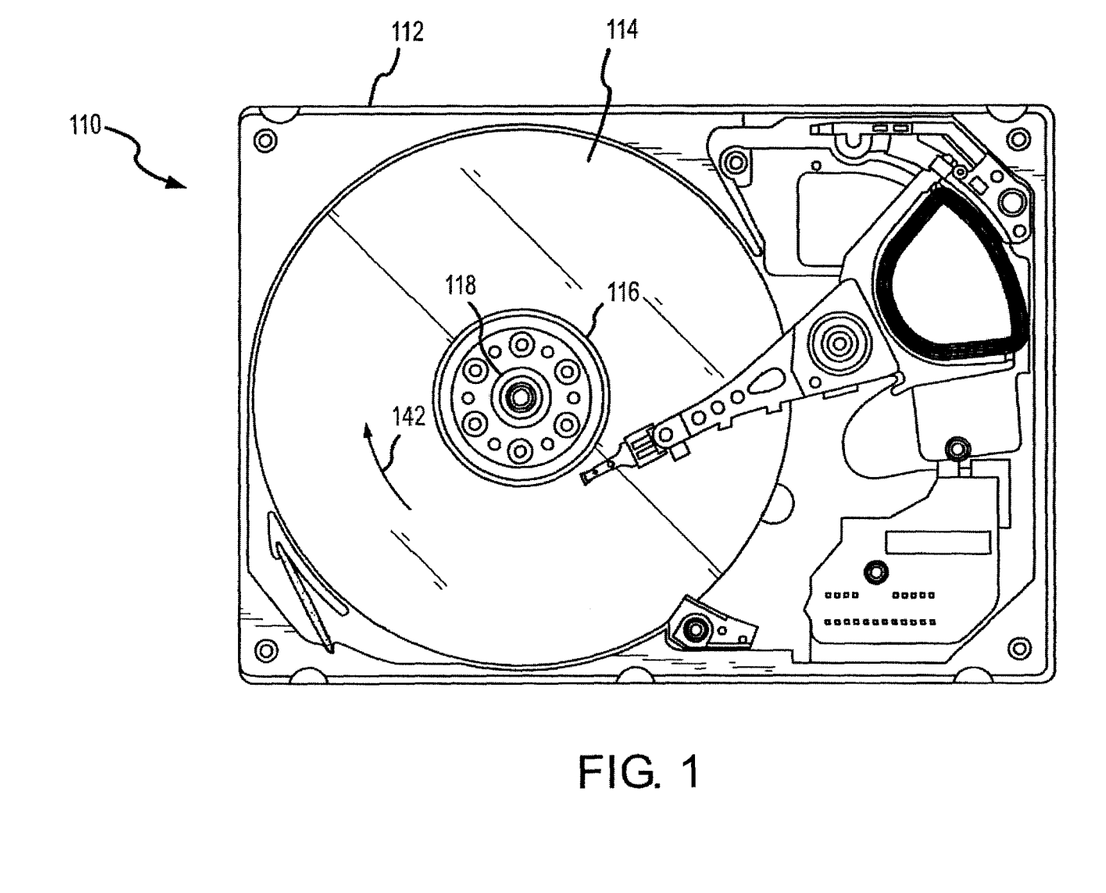
FIG. 1 illustrates a top plan view of a disk drive device.

The present invention is particularly applicable to magnetic recording disks, such as those useful in a disk drive device. By way of example, FIG. 1 illustrates one embodiment of a disk drive 110. The disk drive 110 generally includes a base plate 112 and a cover (not shown) that may be disposed on the base plate 112 to define an enclosed housing or space for the various disk drive components. The disk drive 110 includes one or more data storage disks 114. Typically, both of the major surfaces of each data storage disk 114 include a plurality of concentrically disposed tracks for data storage purposes. Each disk 114 is mounted on a hub or spindle 116, which in turn is rotatably interconnected with the disk drive base plate 112 and/or cover. Multiple data storage disks 114 are typically mounted in vertically spaced and parallel relation on the spindle 116. Rotation of the disk(s) 114 is provided by a spindle motor 118 that is coupled to the spindle 116 to simultaneously spin the data storage disk(s) 114 in the rotational direction 142 at an appropriate rate.

The present invention is directed to perpendicular recording medium, such as one that is useful as a data storage disk in a disk drive device as illustrated in FIG. 1. However, the recording medium of the present invention is useful in a wide variety of devices and FIG. 1 is presented merely for purposes of illustration.

According to the present invention, the perpendicular magnetic recording medium includes a soft underlayer structure that is adapted to provide reduced adjacent track erasure and good overwrite properties. The soft underlayer structure advantageously has a magnetic permeability gradient within the soft underlayer structure.

Figure 2:
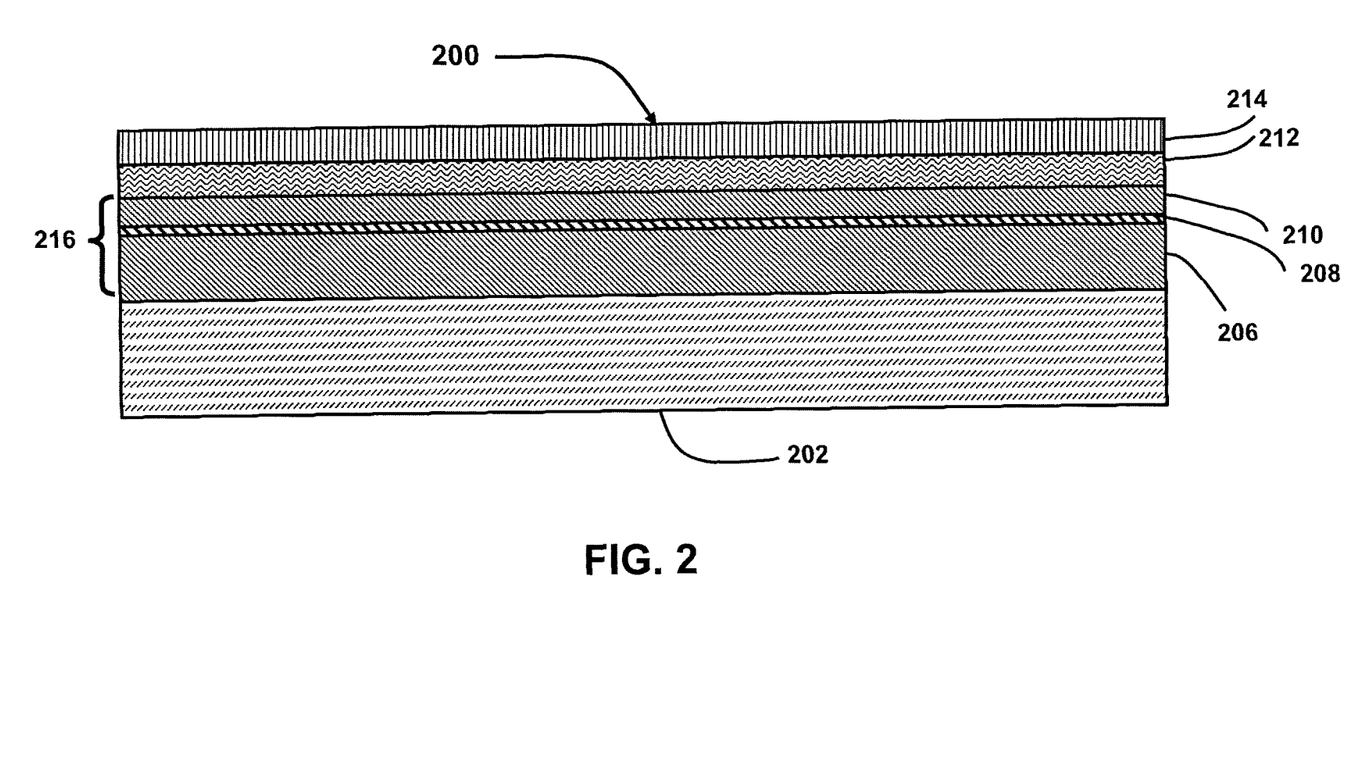
FIG. 2 illustrates a cross-sectional view of a perpendicular recording medium according to an embodiment of the present invention.

FIG. 2 illustrates a cross-sectional view of a perpendicular magnetic recording medium according to an embodiment of the present invention that is useful in a disk drive device. The magnetic recording medium 200 includes multiple layers that are deposited upon a rigid substrate 202. Among the layers disposed on the rigid substrate 202 is a perpendicular magnetic recording layer 214. Disposed between the substrate 202 and the perpendicular magnetic recording layer 214 is a soft underlayer structure 216 in accordance with an embodiment of the present invention. Disposed between the soft underlayer structure 216 and the magnetic recording layer 214 is an intermediate layer 212.

The rigid substrate 202 can be fabricated from a number of materials known to those skilled in the art to be useful for magnetic recording media such as hard disks. A particularly preferred material for the rigid substrate 202 according to the present invention is aluminum (Al) coated with a layer of nickel phosphorous (NiP). However, it will be appreciated that the rigid substrate can also be fabricated from other materials, such as glass and glass-containing materials, including glass-ceramics. The rigid substrate 202 typically has an average thickness in the range of from about 10 mils to about 75 mils (about 0.254 millimeter to 1.9 millimeter) and has a smooth surface upon which the remaining layers can be deposited.

A soft underlayer structure 216 comprises a first soft magnetic layer 206 deposited over the substrate and a non-magnetic spacer layer 208 deposited over the first soft magnetic layer 206, and a second soft magnetic layer 210 deposited over the spacer layer 208.

The non-magnetic spacer layer 208 is fabricated from a non-magnetic material. Examples of non-magnetic materials include tantalum (Ta), ruthenium (Ru), rhenium (Re), rhodium (Rh), chromium (Cr) and copper (Cu). In one embodiment, the spacer layer 208 comprises Ta and can consist essentially of Ta. The thickness of the non-magnetic spacer layer can be, for example, about 2 nanometers.

According to the present invention, a bottom soft magnetic layer 206 (i.e., disposed closest to the substrate) and a top soft magnetic layer 210 (i.e., that disposed closer to the magnetic recording layer 214) are fabricated from different magnetic materials having different magnetic permeabilities to provide a permeability gradient in the soft underlayer structure 216.

According to one embodiment, a permeability gradient is provided wherein the bottom soft magnetic layer 206 has a magnetic permeability that is greater than the magnetic permeability of the top soft magnetic layer 210. Compared to OW, ATE is more sensitive to the permeability of the SUL structure at a depth closer to the recording layer. By using a lower permeability top soft magnetic layer 210, ATE can be significantly suppressed. The bottom, higher permeability soft magnetic layer 206 is adapted to provide significant total magnetic permeability (top soft magnetic layer plus bottom soft magnetic layer) so that a satisfactory level of OW, such as greater than about 28 dB, can be maintained.

Examples of materials that can be utilized for a higher magnetic permeability bottom layer 206 include: $CO_aB_b$, such as where a is from 40 to 70 and b is from 30 to 60; $NiFe_aNb_b$, such as where a is from 10 to 30 and b is from 5 to 10; $NiFe_aMo_b$, such as where a is from 10 to 30 and b is from 5 to 10; or $CoTa_aZr_b$, such as where a is from 15 to 20 and b is from 5 to 10.

Examples of materials that can be utilized for a lower magnetic permeability top layer 210 include: $CoZr_aTa_b$, such as where a is from 2 to 8 and b is from 5 to 12; $CoZr_aNb_b$, such as where a is from 2 to 8 and b is from 5 to 12; $CoFe_aB_b$, such as where a is from 10 to 20 and b is from 5 to 20; $CoFe_aSi_bB_c$, such as where a is from 10 to 20, Si is from 5 to 10 and B is from 5 to 20; $FeTa_aNb_b$, such as where a is from 5 to 10 and b is from 5 to 10; and $FeZr_a$, such as where a is from 5 to 15.

The top soft magnetic layer 210 and the bottom soft magnetic layer 206 can have the same thickness or can have different thicknesses. In one embodiment, the thickness of the top soft magnetic layer 210 is from about 10 percent to about 60 percent of the total thickness of the soft underlayer structure 216, and more preferably is from about 20 percent to about 40 percent of the total thickness of the soft underlayer structure 216. The soft underlayer structure 216 can have a total thickness of from about 40 nanometers to about 160 nanometers.

Disposed over the soft underlayer structure 216 can be an intermediate layer 212. The thickness of the intermediate layer can preferably be from about 2 to about 50 nanometers. The intermediate layer 212 can be fabricated from materials such as, for example, Ru, Cr, Ta, Ni, Al or other alloys that result in good growth properties of the perpendicular magnetic layer 214. According to one embodiment, the intermediate layer comprises two distinct sub-layers, such as a seedlayer of Ta, Ti or their alloys and having a thickness of from about 1 to 3 nanometers and an adjacent Ru or Ru alloy (e.g., RuCr) sub-layer having a thickness of from about 5 to about 40 nanometers, with the Ru or Ru alloy sub-layer being disposed adjacent to the magnetic recording layer.

A perpendicular magnetic recording layer 214 is deposited over the intermediate layer 212. The magnetic recording layer 214 has an easy magnetization axis (e.g., the C-axis) that is oriented substantially perpendicular to the surface of the magnetic recording layer 214. Useful materials for the magnetic recording layer 214 can include cobalt-based alloys having a hexagonal close packed (hcp) structure. Cobalt can be alloyed with elements such as chromium (Cr), platinum (Pt), boron (B), niobium (Nb), tungsten (W) and tantalum (Ta). In one embodiment, the magnetic recording layer 214 includes cobalt alloyed with chromium (CoCr). As used herein, the term CoCr alloys can include alloys having other components in addition to Co and Cr. For example, a CoCr alloy can also include platinum (CoCrPt) and the CoCrPt alloy can include other elements such as boron (CoCrPtB). In addition, the magnetic recording layer can comprise an oxide, such as a CoCrPt-oxide or a CoCrPtB-oxide. Such oxides can further include silicon (Si), such as a CoCrPtSi-oxide or a CoCrPtBSi-oxide. The magnetic recording layer 214 can have an average thickness of at least about 1 nanometer, such as from about 15 nanometers to about 30 nanometers.

The perpendicular magnetic recording medium 200 can also include a protective layer (not illustrated) such as a protective carbon layer and a lubricant layer disposed over the protective layer. These layers are adapted to reduce damage from the read/write head interactions with the recording medium during start/stop operations.

In the SUL structure 216 described above with reference to FIG. 2, there are four parameters which together influence the ATE and OW—namely, the permeability of the top magnetic layer 210, the thickness of the top magnetic layer, the permeability of the bottom magnetic layer 206, and the thickness of the bottom magnetic layer. According to the present invention, a balance can be achieved among these parameters so that a magnetic permeability gradient structure (e.g., lower permeability near the top and higher permeability near the bottom) causes reduced ATE as compared to a constant permeability SUL of similar material at the same OW.

The permeability and the thickness of the top and bottom soft magnetic layers of the SUL structure can be selected by applying the following criteria.

1) The magnetic permeability of a top layer should be low enough so that the ATE is acceptably low.

2) The magnetic permeability of a top layer should be high enough so that the OW is acceptably high.

3) The thickness of a top layer should be high enough so that the ATE is sufficiently suppressed.

4) The magnetic permeability and the thickness of a bottom layer should be high enough so that the OW is acceptably high.

5) The magnetic permeability of a bottom layer should also be low enough so that ATE is acceptably low.

Figure 3:
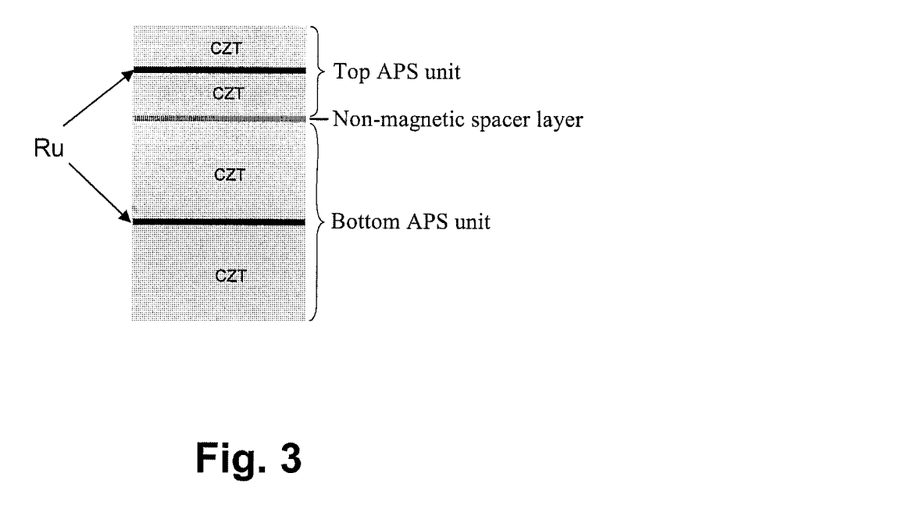
FIG. 3 illustrates a cross-sectional view of a soft underlayer structure for a perpendicular recording medium according to an embodiment of the present invention.

Other SUL structures can be fabricated in accordance with the present invention. FIG. 3 illustrates an embodiment where the top and bottom soft magnetic layers of FIG. 2 are anti-parallel coupled soft magnetic layered (APS) units. APS units comprise soft magnetic layers separated by a thin non-magnetic coupling layer such that the soft magnetic layers are anti-parallel coupled through the coupling layer. For example, each APS unit can comprise two soft magnetic layers such as CoZrTa separated by a Ru coupling layer, where the two APS units are in turn separated by a thin non-magnetic spacer layer such as Ta. The top APS unit can have a total thickness that is less than the total thickness of the bottom APS unit. Further, the two APS units can have different magnetic permeabilities, such as where the top APS unit has a magnetic permeability that is less than the magnetic permeability of a lower APS unit.

Figure 4:
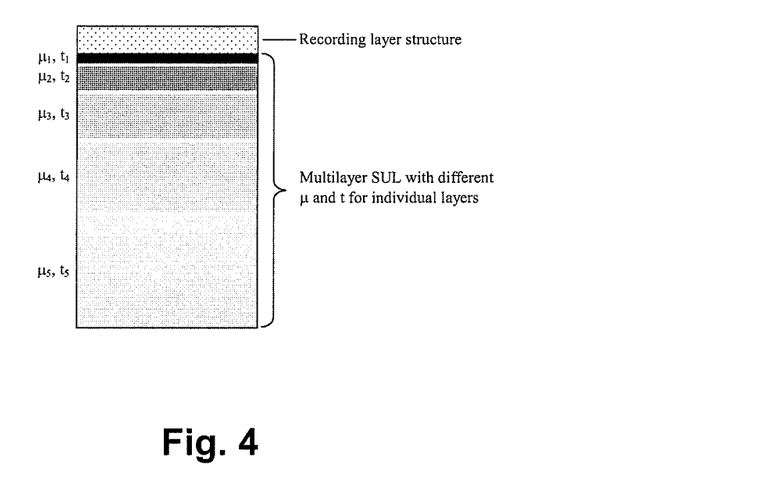
FIG. 4 illustrates a cross-sectional view of a soft underlayer structure for a perpendicular recording medium according to an embodiment of the present invention.

FIG. 4 illustrates a SUL structure having multiple layers of soft magnetic materials, where the magnetic permeability increases from the top of the structure (nearest the recording layer) to the bottom of the structure (nearest the substrate). For this SUL structure, either the permeability (p) or the thickness (t), or both μ and t, are different among the individual soft magnetic layers. Either μ, t, or both can be selected to increase or decrease in value through the depth of the SUL structure. The presence of a relatively low magnetic permeability layer in the structure will reduce ATE, while the presence of a relatively high magnetic permeability layer will increase OW.

The relatively high magnetic permeability layer (e.g., $\mu_5$) can be fabricated from, for example: $FeTa_aNb_b$, such as where a is from 5 to 10 and b is from 5 to 10; $FeZr_a$, such as where a is from 5 to 15; CoNiFe, such as $CoNi_{10}Fe_{10}$; or CoFe, such as $Co_{90}Fe_{10}$. Intermediate magnetic permeability layers, such as layers $\mu_3$ and $\mu_4$, can be fabricated from, for example: $CoZr_aTa_b$, such as where a is from 2 to 8 and b is from 5 to 12; $CoZr_aNb_b$, such as where a is from 2 to 8 and b is from 5 to 12; $CoFe_aB_b$, such as where a is from 10 to 20 and b is from 5 to 20; $CoFe_aSi_b$, such as where a is from 10 to 20 and b is from 5 to 20; or $CoFe_aSi_bB_c$, such as where a is from 10 to 20, b is from 5 to 10 and c is from 5 to 20. Lower magnetic permeability layers, such as layers $\mu_1$ and $\mu_2$, can be fabricated from, for example: NiFe, such as $Ni_{80}Fe_{20}$; $NiFe_aNb_b$, such as where a is from 10 to 30 and b is from 5 to 10; $NiFe_aMo_b$, such as where a is from 10 to 30 and b is from to 10; $CoTa_aZr_b$, such as where a is from 15 to 20 and b is from 5 to 10; or $CO_aB_b$, such as where a is from 40 to 70 and b is from 30 to 60.

Figure 5:
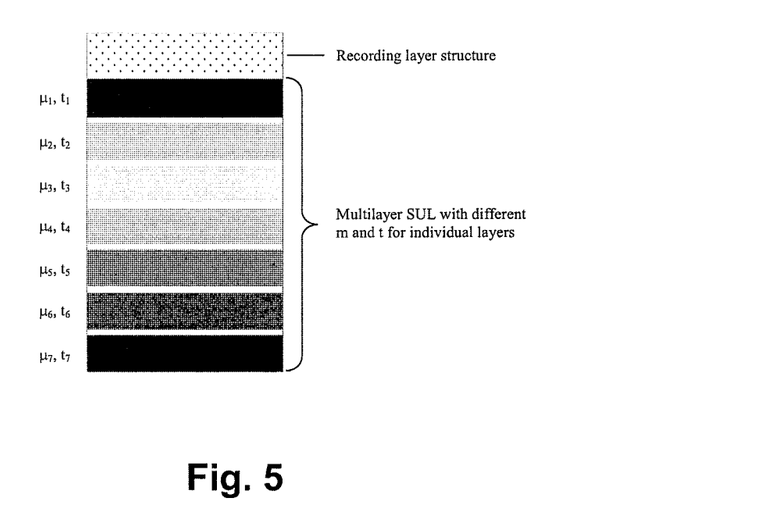
FIG. 5 illustrates a cross-sectional view of a soft underlayer structure for a perpendicular recording medium according to an embodiment of the present invention.

FIG. 5 illustrates an alternative embodiment of a soft underlayer structure where either u, t or both, can also be selected so that the maximum or minimum value is located at a preselected depth within the multilayer SUL structure. For example, in FIG. 5, the magnetic permeability of a third soft magnetic layer ($\mu_3$) is higher than adjacent layers and is disposed at a preselected depth within the structure.

Referring to FIG. 5, the relatively high magnetic permeability layer ($\mu_3$) can be fabricated from, for example: $FeTa_aNb_b$, such as where a is from 5 to 10 and b is from 5 to 10; $FeZr_a$, such as where a is from 5 to 15; CoNiFe, such as $CoNi_{10}Fe_{10}$; or CoFe, such as $Co_{90}Fe_{10}$. Intermediate magnetic permeability layers, such as layers $\mu_2$, $\mu_4$ and $\mu_5$, can be fabricated from, for example: $CoZr_aTa_b$, such as where a is from 2 to 8 and b is from 5 to 12; $CoZr_aNb_b$, such as where a is from 2 to 8 and b is from 5 to 12; $CoFe_aB_b$, such as where a is from 10 to 20 and b is from 5 to 20; $CoFe_aSi_b$, such as where a is from 10 to 20 and b is from 5 to 20; or $CoFe_aSi_bB_c$, such as where a is from 10 to 20, b is from 5 to 10 and c is from 5 to 20. Lower magnetic permeability layers, such as layers $\mu_1$, $\mu_6$ and $\mu_7$, can be fabricated from, for example: NiFe, such as $Ni_{80}Fe_{20}$; $NiFe_aNb_b$, such as where a is from 10 to 30 and b is from 5 to 10; or $NiFe_aMo_b$, such as where a is from 10 to 30 and b is from 5 to 10.

The structures illustrated in FIG. 2 to FIG. 5 are for purposes of illustration and illustrate just some examples of arrangements of $\mu_1$ and t. The principal concept of the present invention is a gradient, or a local maximum or minimum, of magnetic permeability along the depth of the SUL so that a reduced ATE and a sufficiently high OW can be simultaneously achieved.

EXAMPLES

Each of the following samples are formed by depositing material layers on NiP-plated AlMg disk substrates. Four types of SUL are prepared with various total thicknesses, as summarized in Table 1.

TABLE 1

| Sample | Soft Underlayer Structure | Total SUL Thickness (Å) |
|---|---|---|
| C-SUL | CoZrTa (single layer) | 400, 800, 1200, 1600 |
| APS-1 | CoZrTa/Ru/CoZrTa | 400, 800, 1200, 1600 |
| APS-2 | CoZrTa/Ru/Co/CoZrTa | 40, 800, 1200 |
| APS-3 | APS-1/TA/APS-1 | 1000 |

APS-1 differs from a conventional CoZrTa SUL (c-SUL) by a 7 Å Ru layer that is disposed between two equal-thickness CoZrTa layers. APS-2 differs from APS-1 by an additional 10 Å Co layer between the Ru layer and the top CoZrTa layer, to enhance antiferromagnetic coupling between the two CoZrTa layers. In addition, a double-APS design (APS-3) is also investigated for the optimization of ATE and OW properties. In the double-APS structure, two APS-1 structures separated by a 30 Å Ta layer are deposited in sequence. The thickness ratio of the top and bottom APS-1 units is varied, but the total SUL thickness is kept constant at 1000 Å. The 30 Å Ta layer breaks the exchange coupling between the two APS-1 units. An identical recording layer structure including spacing layers and carbon overcoats is used above the SUL for all of these samples.

Magnetic permeability is calculated from the hysteresis loop measured on a vibrating sample magnetometer. OW and ATE are measured on a Guzik 1701 B spin stand with an RWA2002 controller. ATE is measured for 120 tracks on each side of the stressing track. The 240 tracks are written once with 45 mA at a linear density of 60 kfci (kilo flux changes per inch), and the stressing track is written for 32,000 revolutions with 55 mA at a linear density of 360 kfci. Only even number sectors are stressed while the odd number sectors serve as an unstressed signal reference.

Figure 6:
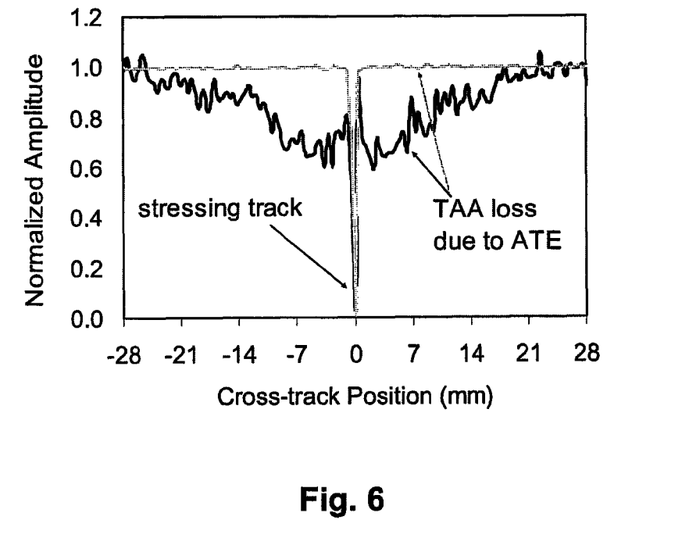
FIG. 6 illustrates a cross-track profile illustrating adjacent track erasure for perpendicular recording media.

FIG. 6 illustrates a cross-track profile from an ATE test on samples c-SUL (dark line) and an APS-2 sample (gray line). It is observed that the APS structure of the APS-2 sample largely suppresses the ATE, particularly due to the Co layer, which enhances the exchange coupling strength.

Figure 7:
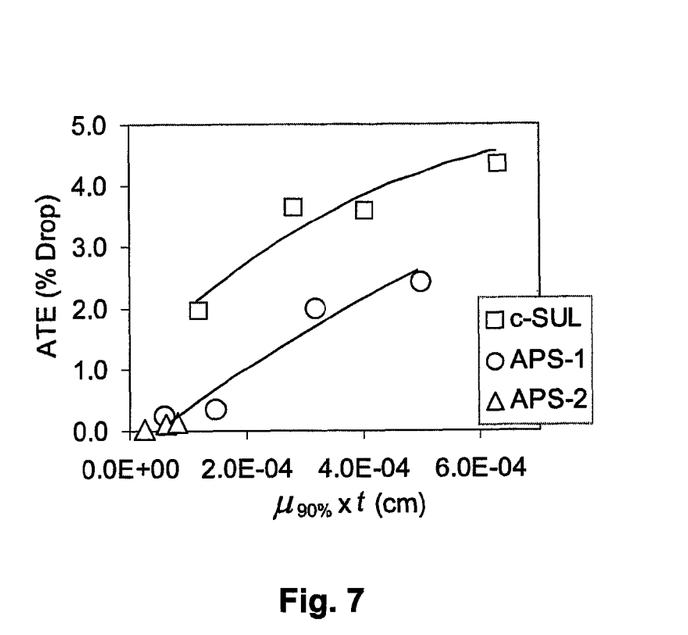
FIG. 7 illustrates adjacent track erasure of perpendicular recording media as a function of magnetic permeability thickness product.

ATE can be quantified by averaging the percentage loss of the track average amplitude (TAA) over the 240 tracks and plotting against a material property, such as the magnetic permeability. In FIG. 7, ATE is plotted against the product of magnetic permeability ($\mu_{90\%}$) and layer thickness (t). Permeability is measured at 90% saturation magnetization ($M_s$) on the magnetic hysteresis loop along the hard axis. Magnetic permeability at other percentages of $M_s$ is also measured, and the strongest correlations are found with the $\mu_{90\%}$ values. If ATE is related to the amount of flux an SUL is capable of conducting, magnetic permeability and SUL thickness combined would determine the extent of ATE.

FIG. 7 illustrates the results for the conventional c-SUL and two different APS structures, APS-1 and APS-2. With each type of SUL, ATE increases monotonically with the product $\mu \times t$. However, the offset between sample c-SUL and sample APS-1 indicates that the total amount of magnetic flux that an SUL is capable of conducting does not fully predict ATE.

Figure 8:
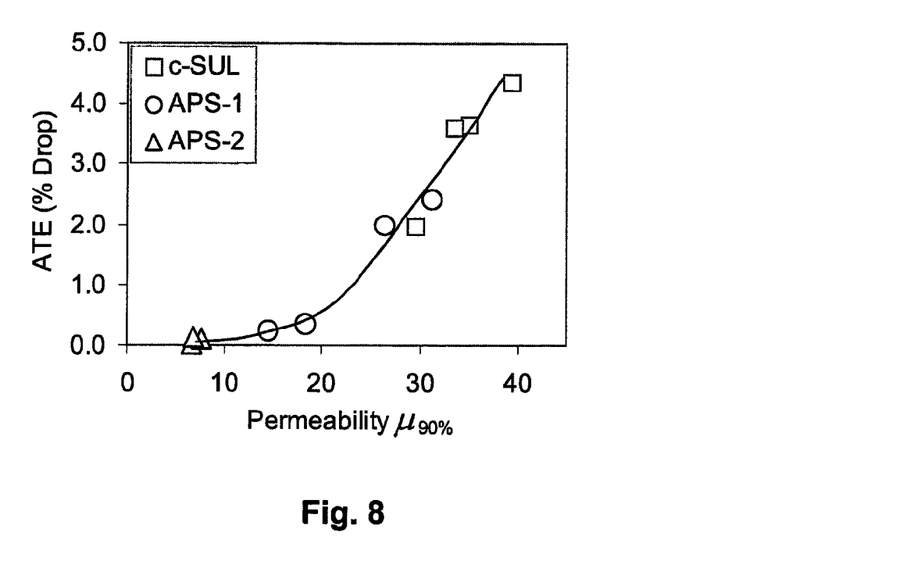
FIG. 8 illustrates adjacent track erasure of perpendicular recording media as a function of magnetic permeability.

FIG. 8 illustrates ATE as a function of magnetic permeability for the same samples as in FIG. 7. FIG. 8 illustrates that the ATE is strongly correlated to the magnetic permeability. Taken together, FIG. 7 and FIG. 8 suggest that, within the SUL thickness range studied, ATE is controlled more by the magnetic permeability, a material property, rather than the SUL thickness. One interpretation of this result is that the mechanism of ATE only involves a limited depth from the top surface of the entire SUL thickness. Given that the smallest SUL thickness of the samples is 400 Å, the finite depth of the SUL that is involved in the ATE mechanism is believed to be less than 400 Å.

Overwrite (OW) is a magnetic media property that is similar in nature to ATE. Both OW and ATE are indicative of media writability under an external field, although a high writability is undesirable in ATE.

In an OW measurement of perpendicular media, a data track previously written at a linear density of 360 kfci is overwritten at a linear density of 60 kfci. Under this test condition, an OW value of 35 dB, corresponding to more than 98% erasure in one revolution, is achievable. Such a level of erasure requires a write field of about 10 kOe or stronger under the write pole to overcome media coercivity at the recording time scale. In the ATE test, the tracks were exposed to the stray field from the shields during repeated writing of the stressing track. Under these conditions, a typical ATE value is about 3% signal (TAA) erasure. Therefore, by comparison, the stray field or flux density underneath the shield during writing should be orders of magnitude smaller than the writing field under the write pole.

Figure 9:
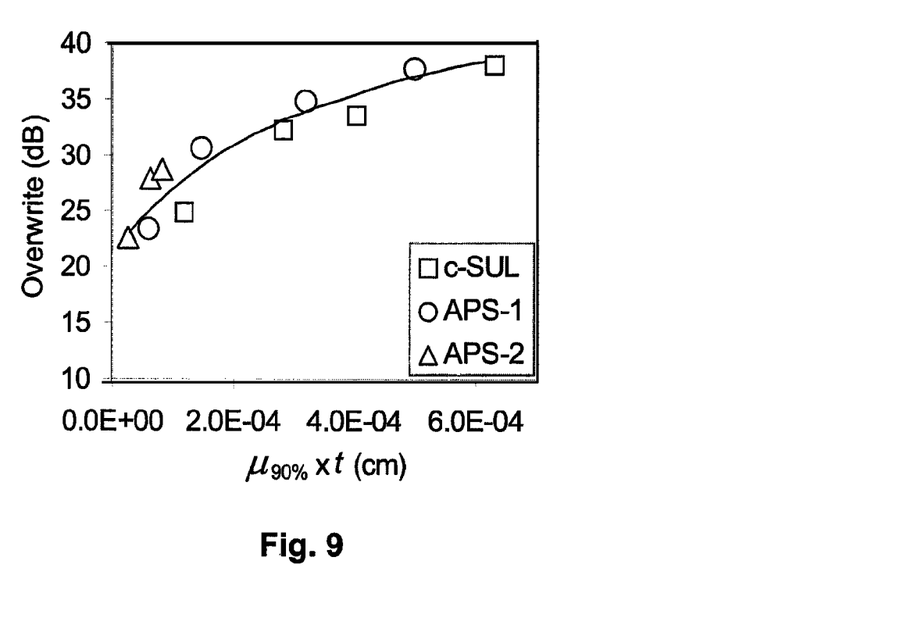
FIG. 9 illustrates overwrite of perpendicular recording media as a function of magnetic permeability thickness product.
Figure 10:
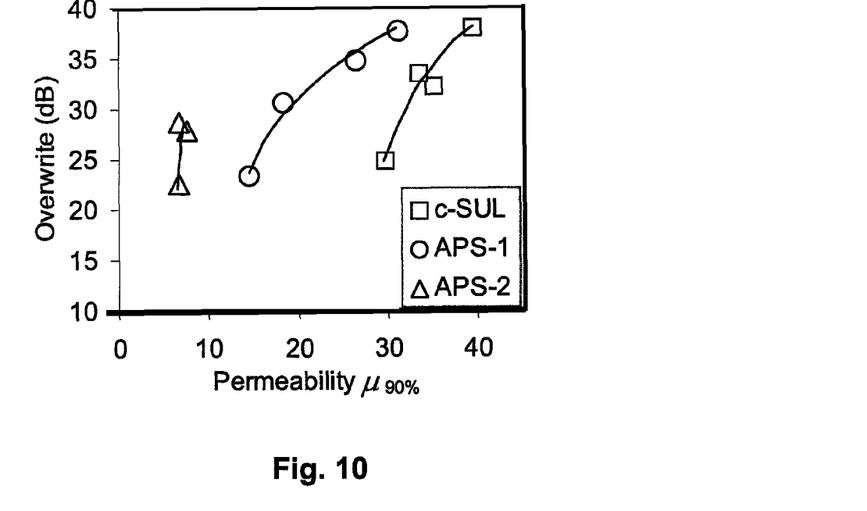
FIG. 10 illustrates overwrite of perpendicular recording media as a function of magnetic permeability.

In FIG. 9 and FIG. 10, media OW measured on those samples with three SUL types is plotted against $\mu \times t$ and $\mu$, respectively. Unlike ATE, OW correlates well with $\mu \times t$ (FIG. 9), but only correlates well with $\mu$ among the samples of the same SUL type (FIG. 10). Offset is clearly seen in FIG. 10 between different SUL types. The difference between FIG. 9 and FIG. 10 indicates that SUL thickness is also a contributing factor in OW. One explanation is that the writing (or overwriting) process under the write pole involves almost the entire thickness of the SUL.

Since differing sources of field, and possibly differing depths of SUL, are involved in the OW and ATE processes, by introducing a permeability gradient along the depth of the SUL according to the present invention, a balance can be found between ATE and OW.

Samples with a double-APS SUL (APS-3) design are studied. These double-APS structures include two units, each comprising of CoZrTa layers separated by Ru (e.g., APS-1), with the two units APS-1 units being separated by a thin layer of Ta. If ATE only involves a finite depth of SUL from the top surface, samples with a relatively thin top APS-1 unit would have the least amount of ATE because of the low permeability of the top APS-1 layer. At the same time, OW should be largely unaffected by the change of the thickness ratio between the top and bottom APS-1 units because the overall magnetic permeability should be largely constant and the total SUL thickness remains the same (1000 Å).

Figure 11:
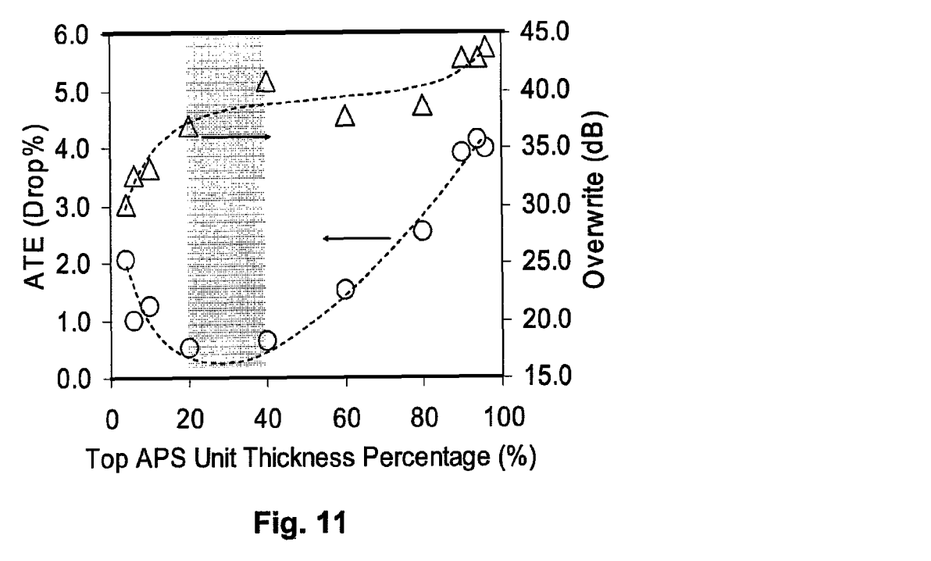
FIG. 11 illustrates adjacent track erasure and overwrite for perpendicular recording media.

FIG. 11 shows the trends of both OW and ATE of these APS-3 samples as a function of the top APS-1 unit thickness. OW remains largely constant within the range of 20% to 80%. However, at both ends OW increases with the thickness ratio, especially when the top APS-1 unit is thin. This increase is believed to be due to the magnetic spacing effect. Specifically, when an APS unit is thin, the antiferromagnetic exchange field is high and the permeability becomes very low. The thin APS unit, being on the top or at the bottom in the double-APS structure, behaves in the way similar to a magnetic deadlayer. Similar testing conditions show that a 4 nm increase in the spacing between the recording layer and the SUL would result in a 5 to 7 dB loss in OW, consistent with the lower OW among samples with a thin top APS unit as seen in FIG. 11.

ATE is caused by the stray magnetic field generated underneath the shields. The footprints of the shields are at a scale of about 50 µm by 3 µm and are orders of magnitude larger than that of the main pole (about 0.1 µm by 0.2 µm). It is plausible that a change of a few nanometers in magnetic spacing would have less significant effect on the field underneath the shield compared to the write pole, especially when the field underneath the shield is weak. Therefore, a thin and low permeability top layer in the SUL might not significantly affect the ATE level. Taken together, an interpretation of the data in FIG. 7 and FIG. 8 is that ATE involves only a finite thickness, likely 400 Å or less, out of the total SUL thickness. It is, however, not necessary for this finite thickness to be the top portion of the SUL. The flux seems to bypass the thin and low permeability top layer and generate ATE through the higher permeability portion of the SUL. In the double-APS structure, the high permeability APS unit seems to determine the extent of ATE as seen in FIG. 11. The magnetic spacing effect can still be seen in ATE when comparing the ATE levels at the two ends of the thickness ratio in FIG. 11. When the higher permeability portion of the SUL is close to the head (e.g., for the high thickness ratios in FIG. 11), the ATE level is higher. ATE shows a minimum at a thickness ratio of about 30%, which is likely the combined result of permeability and magnetic spacing effects. At a thickness ratio of about 30%, the thickness ratio where ATE is minimal <<0.5%), OW is also at a satisfactory level (>35 dB).

The foregoing examples demonstrate that the sensitivity of ATE towards: 1) SUL permeability; 2) SUL thickness; and 3) head/SUL spacing, is different from the sensitivity of OW towards these three factors. This difference in sensitivity can be utilized according to the present invention to design the SUL so that ATE can be reduced while OW remains at a satisfactory level.

While various embodiments of the present invention have been described in detail, it is apparent that modifications and adaptations of those embodiments will occur to those skilled in the art. However, is to be expressly understood that such modifications and adaptations are within the spirit and scope of the present invention.

What is claimed is:

1. A magnetic stack, comprising:
a substrate;
a soft underlayer structure disposed over the substrate, the soft underlayer structure comprising:
a first anti-parallel coupled soft magnetic layered unit having a first magnetic permeability;
a second anti-parallel coupled soft magnetic layered unit that is disposed over said first anti-parallel coupled soft magnetic layered unit and having a second magnetic permeability, wherein the first magnetic permeability is different than the second magnetic permeability; and
a third soft magnetic layer having a third magnetic permeability, wherein the third magnetic permeability is different than either of the first and second magnetic permeabilities.

2. The magnetic stack of claim 1, further comprising a non-magnetic spacer layer disposed between the first and second anti-parallel coupled soft magnetic layered units.

3. The magnetic stack of claim 2, wherein:
each of the first and second anti-parallel coupled soft magnetic layered units comprise two layers of a soft magnetic material and a non-magnetic Ru layer disposed between the layers of soft magnetic material; and
the nonmagnetic spacer layer comprises Ta.

* * * * *